(12) United States Patent
Liu et al.

(10) Patent No.: US 8,117,233 B2
(45) Date of Patent: *Feb. 14, 2012

(54) METHOD AND SYSTEM FOR MESSAGE-ORIENTED SEMANTIC WEB SERVICE COMPOSITION BASED ON ARTIFICIAL INTELLIGENCE PLANNING

(75) Inventors: Zhen Liu, Tarrytown, NY (US); Anand Ranganathan, White Plains, NY (US); Anton V. Riabov, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 504 days.

This patent is subject to a terminal disclaimer.

(21) Appl. No.: 11/748,216

(22) Filed: May 14, 2007

(65) Prior Publication Data
US 2008/0288595 A1 Nov. 20, 2008

(51) Int. Cl.
*G06F 7/00* (2006.01)
(52) U.S. Cl. ........................................ 707/802; 707/608
(58) Field of Classification Search ........... 707/999.007, 707/802, 608
See application file for complete search history.

(56) References Cited

U.S. PATENT DOCUMENTS

| | | | |
|---|---|---|---|
| 5,675,786 A | 10/1997 | McKee et al. | |
| 6,086,619 A * | 7/2000 | Hausman et al. | 703/6 |
| 6,523,174 B1 * | 2/2003 | Gould et al. | 717/162 |
| 6,640,231 B1 | 10/2003 | Andersen et al. | |
| 6,742,054 B1 * | 5/2004 | Upton, IV | 710/6 |
| 7,016,910 B2 | 3/2006 | Egilsson et al. | |
| 7,505,989 B2 | 3/2009 | Gardner et al. | |
| 7,577,554 B2 * | 8/2009 | Lystad et al. | 703/2 |
| 7,665,064 B2 * | 2/2010 | Able et al. | 717/117 |
| 7,716,272 B2 * | 5/2010 | Skwarek et al. | 709/201 |
| 7,739,351 B2 * | 6/2010 | Shkvarchuk et al. | 709/217 |
| 7,877,421 B2 | 1/2011 | Berger et al. | |
| 7,904,545 B2 | 3/2011 | Golovchinsky et al. | |
| 2003/0055668 A1 * | 3/2003 | Saran et al. | 705/1 |
| 2003/0120642 A1 | 6/2003 | Egilsson et al. | |
| 2003/0135628 A1 * | 7/2003 | Fletcher et al. | 709/229 |
| 2003/0142818 A1 | 7/2003 | Raghunathan et al. | |
| 2004/0024841 A1 * | 2/2004 | Becker et al. | 709/219 |
| 2004/0073545 A1 * | 4/2004 | Greenblatt et al. | 707/3 |

(Continued)

OTHER PUBLICATIONS

Jos de Bruijn, "Semantic Web Technologies: Advanced SPARQL", published 2006, pp. 1-4. accessed online at <http://www.inf.unibz.it/~debruijn/teaching/swt/2006/lecture4-handouts-2x3.pdf> on Sep. 22, 2009.*

(Continued)

*Primary Examiner* — Hung T Vy
*Assistant Examiner* — Phuong Thao Cao
(74) *Attorney, Agent, or Firm* — William J. Stock; F. Chau & Associates, LLC

(57) ABSTRACT

A method for modeling a web service operation, includes: defining an input message pattern that describes input requirements of a web service operation, wherein the input message pattern includes a set of variables representing data elements that must be contained in a message input to the web service operation, and a graph pattern that semantically describes the data elements that must be contained in the message input to the web service operation; and defining an output message pattern that describes an output message of the web service operation, wherein the output message pattern includes a set of variables and exemplars that represent data elements contained in the output message, and a graph pattern that semantically describes the data elements contained in the output message.

17 Claims, 5 Drawing Sheets

U.S. PATENT DOCUMENTS

| | | | |
|---|---|---|---|
| 2004/0073661 A1* | 4/2004 | Eibach et al. | 709/224 |
| 2004/0111533 A1* | 6/2004 | Beisiegel et al. | 709/246 |
| 2004/0138936 A1 | 7/2004 | Johnson et al. | |
| 2004/0148214 A1* | 7/2004 | Aziz et al. | 705/8 |
| 2004/0162741 A1 | 8/2004 | Flaxer et al. | |
| 2005/0021548 A1 | 1/2005 | Bohannon et al. | |
| 2005/0021745 A1 | 1/2005 | Bookman et al. | |
| 2005/0044525 A1* | 2/2005 | Lazarov | 717/104 |
| 2005/0055330 A1* | 3/2005 | Britton et al. | 707/1 |
| 2005/0093881 A1* | 5/2005 | Okita et al. | 345/589 |
| 2005/0114757 A1 | 5/2005 | Sahota et al. | |
| 2005/0289134 A1* | 12/2005 | Noguchi | 707/4 |
| 2006/0031288 A1* | 2/2006 | Ter Horst et al. | 709/204 |
| 2006/0036983 A1* | 2/2006 | Iwashita | 716/5 |
| 2006/0053172 A1 | 3/2006 | Gardner et al. | |
| 2006/0167856 A1* | 7/2006 | Angele et al. | 707/3 |
| 2006/0167946 A1 | 7/2006 | Hellman et al. | |
| 2006/0173868 A1* | 8/2006 | Angele et al. | 707/100 |
| 2006/0195332 A1* | 8/2006 | Bogner et al. | 705/1 |
| 2006/0195463 A1* | 8/2006 | Bogner et al. | 707/101 |
| 2006/0200251 A1 | 9/2006 | Gu et al. | |
| 2006/0212855 A1* | 9/2006 | Bournas et al. | 717/140 |
| 2006/0236306 A1* | 10/2006 | DeBruin et al. | 717/113 |
| 2007/0021995 A1* | 1/2007 | Toklu et al. | 705/7 |
| 2007/0023515 A1 | 2/2007 | Urken | |
| 2007/0043803 A1 | 2/2007 | Whitehouse et al. | |
| 2007/0050227 A1* | 3/2007 | Teegan et al. | 705/8 |
| 2007/0078815 A1 | 4/2007 | Weng et al. | |
| 2007/0156430 A1 | 7/2007 | Kaetker et al. | |
| 2007/0162893 A1 | 7/2007 | Moosmann et al. | |
| 2007/0168303 A1 | 7/2007 | Moosmann et al. | |
| 2007/0174811 A1 | 7/2007 | Kaetker et al. | |
| 2007/0179826 A1 | 8/2007 | Cutlip et al. | |
| 2007/0186209 A1 | 8/2007 | Kaetker et al. | |
| 2007/0198971 A1 | 8/2007 | Dasu et al. | |
| 2007/0220046 A1 | 9/2007 | Moosmann et al. | |
| 2007/0245013 A1* | 10/2007 | Saraswathy et al. | 709/223 |
| 2007/0265862 A1 | 11/2007 | Freund et al. | |
| 2007/0288250 A1* | 12/2007 | Lemcke et al. | 705/1 |
| 2008/0005155 A1* | 1/2008 | Soma et al. | 707/102 |
| 2008/0005278 A1* | 1/2008 | Betz et al. | 709/219 |
| 2008/0120129 A1 | 5/2008 | Seubert et al. | |
| 2008/0127064 A1 | 5/2008 | Orofino et al. | |
| 2008/0161941 A1 | 7/2008 | Strassner et al. | |
| 2008/0243449 A1 | 10/2008 | Feblowitz et al. | |
| 2008/0250390 A1 | 10/2008 | Feblowitz et al. | |
| 2008/0288595 A1 | 11/2008 | Liu et al. | |
| 2010/0191521 A1 | 7/2010 | Huet et al. | |

OTHER PUBLICATIONS

Riabov et al., "Planning for Stream Processing Systems", AAAI 2005, pp. 1-6. (Provided by Applicant).*

Nagarajan et al., "Semantic Interoperability of Web Services—Challenges and Experiences", 2006, pp. 1-8, accessed online at <http://lsdis.cs.uga.edu/library/download/techRep2-15-06.pdf> on Sep. 22, 2009.*

Fensel et al., "The Web Service Modeling Framework WSMF", Electronic Commerce Research and Applications 2002, pp. 1-33, accessed online at <http://www.wsmo.org/papers/publications/wsmf.paper.pdf> on Sep. 22, 2009.*

Ankolekar et al., "DAML-S: Semantic Markup for Web Services", 2001, pp. 1-20, accessed online at <http://cimic.rutgers.edu/~ahgomaa/mmis/semantic_markup.pdf> on Sep. 22, 2009.*

Liu et al., "Modeling Web Services using semantic Graph Transformation to aid Automatic Composition", 2007, pp. 1-8, accessed online at <http://choices.cs.uiuc.edu/~ranganat/Pubs/ranganathan_A_Modeling.pdf> on Sep. 22, 2009.*

Owen et al., "BPMN and Business Process Management: Introduction to the New Business Modeling Standard", Popkin Software 2003, pp. 1-27.*

Martin et al., "Bringing Semantics to Web Services: The OWL-S Approach", SWSWPC 2004, vol. 3387 (2004), 17 pages.*

Battle, "Boxes: black, white, grey and glass box views of web-services", HPL-2003-30, 2003, 9 pages.*

Lemmens et al., "Semantic Description of Location based Web Services Using an Extensible Location Ontology", 2004, pp. 261-276.*

L. Baresi and R. Heckel, Tutorial Introduction to Graph Transformation: A Software Engineering Perspective. In 1st Int. Conference on Graph Transformation, 2002.

D. Beradi, D. Calvanese, G. D. Giacomo, R. Hull, and M. Mecella. Automatic Composition of Transition-based Semantic Web Services with Messaging In VLDB, 2005.

B. Grosof, I. Horrocks, R. Volz and S. Decker. Description Logic Programs: Combining Logic Programs with Description Logic. In WWW'03.

Heflin, J. and Munoz-Avila, H. 2002. LCW-Based Agent Planning for the Semantic Web in Ontologies and the Semantic Web, 2002 AAAI Workshop.

M. Leiarge, Z. Liu, and A. Riabov. Automatic Composition of Secure Workflows. In ATC-06, 2006.

S. Narayanan and S. Mollrath Simulation, Verification and Automated Composition of Web Services. In WWW, 2002.

X.T. Nguyen, R. Kowalczyk, and MT. Phan. Modelling and Soliving OoS Composition Problem Using Fuzzy DisCSP. In ICWS. 2006.

J. Pathak, S. Basu and V. Honavar Modelling Web Services by Iterative Reformulation of Functional and Non-finctional Requirements. In ICSOC, 2006.

M. Pistore, P. Traverso. P. Bertoll, and A. Marconi. Automated Synthesis of Composite BPEL4WS Web Services. In ICWS, 2005.

A. Riabov and Z. Liu. Planning for Stream Processing Systems. In AAAI, 2005.

Sheshagirl, M; desJardins, M; and Finin, T. 2003. A Planner for Composing Services Described in DAML-S. In Web Services and Agent-based Engineering AAMAS'03.

Traverso, P., and Pistore, M. 2004. Automated Composition of Semantic Web Services into Executable Processes. In ISWC'04.

Zhou, J.; Ma, L.; Liu, Q.: Zhang, Li.; Yu, Y.; and Pan, Y. 2004. Minerva A Scalable OWL Ontology Storage and Interence System. In 1st Asian Semantic Web Symp.

Sirin, E., and Persia, B 2004. Planning for Semantic Web Services. In Semantic Web Services Workshop at 3rd ISWC.

K. Sivashanmugam, J. Miller, A. Sheth, and K. Verma. Framework for Semantic Web Process Composition. Special Issue of the Interl Journal of Electronic Commerce, 2003.

R. Berbner et al. Heuristics for Qo-S-aware Web Service composition. In ICWS 2006.

A. Riabov and Z. Liu Scalable Planning for Distributed Stream Processing Systems. In ICAPS, 2006.

R. Akkiraju et al. Semaplan: Combining planning with semantic matching to achieve web service composition. In ICWS, 2006.

M. Sullivan. Tribeca: A stream database manager for network traffic analysis. In Proc. of the 22nd Intl. Conf. on Very Large Data Bases, Sep. 1996.

J. Ambite and C. Knoblock. Flexible and scalable query planning in distributed and heterogeneous environments. In AIPS'98, Jun. 1998.

H.Wang and C. Zaniolo: ATLaS: A Native Extension of SQL for Data Mining and Stream Computations, UCLA CS Dept., Technical Report, Aug. 2002.

M. A. Hammad, W. G. Aref, and A. K. Elmagarmid. Stream window join: Tracking moving objects in sensor-network databases. In Proc. of the 15th SSDBM Conference, Jul. 2003.

C. Cranor et al. Gigascope: A stream database for network applications. In SIGMOD, 2003.

S. Chandrasekaran et al. TelegraphCQ: Continuous Dataflow Processing for an Uncertain World. CIDR, 2003.

D. J. Abadi, et al: Aurora: a new model and architecture for data stream management. VLDB J. 12(2): 120-139 (2003).

L'Ecu'E, F., L'Eger, A.: A formal model for semantic web service composition. In: ISWC. (2006).

B. Parsia and E. Sirin. Pellet: An OWL DL reasoner. In the Semantic Web—ISWC 2004, 2004.

N. Jain et al. Design, implementation, and evaluation of the linear road benchmark on the stream processing core. In SIGMOD'06, Jun. 2006.

Y. Gil, E. Deelman, J. Blythe, C. Kesselman, and H. Tangmunarunkit. Artificial intelligence and grids: Workflow planning and beyond. IEEE Intelligent Systems, Jan. 2004.

D. B. Terry et al. Continuous queries over append-only databases. In SIGMOD, pp. 321-330, 1992.

C-N Hsu and C.A. Knoblock. Semantic query optimization for query plans of heterogeneous multi-database systems, IEEE Transactions on Knowledge and Data Engineering, 12(6):959-978, Nov./Dec. 2000.

R. Ginis, R. Strom: An Autonomic Messaging Middleware with Stateful Stream Transformation, Proceedings of the International Conference on Autonomic Computing (ICAC'04).

A. Arasu, S. Babu, J. Widom. The CQL continuous query language: Semantic foundations and query execution. Technical Report 2003-67, Stanford University, 2003.

D.J. Abadi et al. The Design of the Borealis Stream Processing Engine (CIDR), Jan. 2005, Asilomar, CA.

H. Knublauch, M. A. Musen, and A. L. Rector. Editing description logic ontologies with the protege owl plugin. Whistler, BC, Canada, 2004.

M. Stonebraker, U.çetintemel, S.B. Zdonik: The 8 requirements of real-time stream processing. SIGMOD Record 34(4): 42-47 (2005).

Sv Hashemian, A graph-based approach to web services composition, Proceedings of the 2005 Symposium on Applications and the Internet (SAINT '05), pp. 1-7.

* cited by examiner

METHOD AND SYSTEM FOR MESSAGE-ORIENTED SEMANTIC WEB SERVICE COMPOSITION BASED ON ARTIFICIAL INTELLIGENCE PLANNING

RELATED APPLICATIONS

This application is related to: commonly assigned U.S. application Ser. No. 11/695,410, filed Apr. 2, 2007, entitled "METHOD AND SYSTEM FOR COMPOSING STREAM PROCESSING APPLICATIONS ACCORDING TO A SEMANTIC DESCRIPTION OF A PROCESSING GOAL", and incorporated by reference herein in its entirety; and commonly assigned U.S. application Ser. No. 11/695,349, filed Apr. 2, 2007, entitled "METHOD AND SYSTEM FOR AUTOMATICALLY ASSEMBLING PROCESSING GRAPHS IN INFORMATION PROCESSING SYSTEMS", and incorporated by reference herein in its entirety.

BACKGROUND OF THE INVENTION

1. Technical Field

The present invention relates to web service composition, and more particularly, to a method and system for message-oriented semantic web service composition based on artificial intelligence planning.

2. Discussion of the Related Art

A web service is a software system designed to support interoperable Machine-to-Machine interaction over a network. Web services are frequently Web application programming interfaces (APIs) that can be accessed over a network, such as the Internet, and executed on a remote system hosting the requested services.

An important class of web services consists of those that either do data processing or provide information, i.e., they take in messages containing input data or information requests, process them in some manner, and produce messages containing output data or results.

A challenge for software developers is to allow automatic composition of workflows (made up of web services) that process, transform or analyze data to produce some desired information. In such workflows, it is necessary to have expressive models of messages and of data processing capabilities of web services to compose services that are semantically compatible and to create workflows that produce the desired information.

However, many existing service models like OWL-S (as described in Martin et al, D. 2004. OWL-S: Semantic markup for web services. In W3C Submission) do not allow expressions with variables in describing inputs and outputs. For example, OWL-S describes inputs and outputs using concepts in an ontology. Similarly to OWL-S, SA-WSDL (as described in Akkiraju et al, R. 2005. Web service semantics—WSDL-S. W3C Submission), which allows linking semantic annotations to WSDL files, associates inputs and outputs with concepts in an ontology.

During automatic composition of workflows, a planner is used to decide which kinds of messages can be given as input to a web service and how it can construct these messages from other messages that have been produced by other web services in a partial plan. A challenge with planning concerns the use of description logic reasoning for checking if two components car be connected. For example, since a planner needs to perform a large number of such checks while building a plan, this results in a large number of calls to a reasoner during plan-building.

SUMMARY OF THE INVENTION

In an exemplary embodiment of the present invention, a method for modeling a web service operation, comprises: defining an input message pattern that describes input requirements of a web service operation, wherein the input message pattern includes a set of variables representing data elements that must be contained in a message input to the web service operation, and a graph pattern that semantically describes the data elements that must be contained in the message input to the web service operation, and defining an output message pattern that describes an output message of the web service operation, wherein the output message pattern includes a set of variables and exemplars that represent data elements contained in the output message, and a graph pattern that semantically describes the data elements contained in the output message.

Each of the variables is a member of a first set, wherein the first set is infinite and disjoint from a set of resource description framework (RDF) terms. A triple pattern is a member of a second set, wherein the second set includes tuples with three fields, wherein first and third fields of the three fields are members of a third set, wherein the third set includes a union of the set of RDF terms and the first set, and a second field of the three fields is a universal resource indicator (URI).

Each of the graph patterns is a set of triple patterns. The variables of the output message pattern represent data elements carried forward from the message input to the web service operation. The exemplars represent new objects that did not appear in the message input to the web service operation. The exemplars are represented as individuals or literals in a web ontology language (OWL).

In an exemplary embodiment of the present invention, a method for composing a workflow made up of web service operations, comprises: inputting a plurality of modeled web service operations, wherein each of the web service operations includes: a pre-defined input message pattern, wherein the input message pattern includes a set of variables representing data elements that must be contained in a message input to the web service operation, and a graph pattern that semantically describes the data elements that must be contained in the message input to the web service operation, and a pre-defined output message pattern, wherein the output message pattern includes a set of variables and exemplars that represent data elements contained in the output message, and a graph pattern that semantically describes the data elements contained in the output message; inputting a request of a workflow to be composed, wherein the request includes an exemplar request message and a response message pattern; and composing a workflow in the form of a directed acyclic graph (DAG) that has a source vertex, wherein all outgoing edges from the source vertex are associated with semantics defined in the exemplar request message, and that has a sink vertex such that there is a match between exemplar messages associated with incoming edges to the sink vertex and the response message pattern.

The exemplar request message includes a set of data elements, and an RDF graph that semantically describes the data elements in the exemplar request message. The RDF graph of the exemplar request message includes triples that represent facts in OWL. The response message pattern includes a set of variables that correspond to data elements that must be present in an output of the workflow, and an RDF graph pattern that semantically describes constraints on values of the variables of the response message pattern and relationships between different variables of the response message pattern.

Each vertex apart from the source and sink vertices is one of the modeled web service operations. For each vertex representing a web service operation in the workflow there is a match between exemplar messages associated with incoming edges to the vertex and the input message pattern of the web service operation. The match between exemplar messages associated with incoming edges to the vertex and the input message pattern of the web service operation exists when there is a substitution of variables defined in the input message pattern such that: the exemplar messages include at least all the data elements that must be contained in the message input to the web service operation; and an RDF graph obtained after substituting variables in the input graph pattern can be logically inferred from a union of RDF graphs in the exemplar messages. The logic inference is based on a description logic process.

A match between exemplar messages associated with incoming edges to the sink vertex and the response message pattern of the workflow exists when there is a substitution of variables defined in the input message pattern such that: the exemplar messages include at least all the data elements that must be contained in a response message defined in the response message pattern of the workflow, and an RDF graph obtained after substituting variables in the graph pattern that is part of the response message pattern can be logically inferred from a union of RDF graphs in the exemplar messages.

In an exemplary embodiment of the present invention, a planner for composing a workflow made up of web service operations, comprises: a domain-generator for receiving a plurality of modeled web service descriptions, translating the web service descriptions into a stream processing planning language (SPPL), and during the translation, performing description logic program (DLP) reasoning on output message graph patterns of the web service descriptions, and storing the translated and reasoned web service descriptions in an SPPL domain; and a plan-builder for receiving a composition request, translating the composition request into a planning goal, and producing a workflow by recursively connecting web service operations to one another based on their web service descriptions stored in the SPPL domain until a goal message is produced.

The DLP reasoning is performed only once for each web service operation in an offline manner. The plan-builder checks graph-embedding relationships between the input message graph pattern and a union of RDF graphs in exemplar messages when producing the workflow.

The plan-builder operates in a pre-solve phase and a plan search phase, wherein in the pre-solve phase the plan builder removes sources that cannot contribute to the goal and translates predicate formulation into a propositional formulation, wherein in the plan search phase the plan-builder performs a branch-and-bound search of the web service descriptions stored in the SPPL domain.

In an exemplary embodiment of the present invention, a computer program product comprises a computer useable medium having computer program logic recorded thereon for modeling a web service composition, the computer program logic comprising: program code for defining an input message pattern that describes input requirements of a web service operation, wherein the input message pattern includes a set of variables representing data elements that must be contained in a message input to the web service operation, and a graph pattern that semantically describes the data elements that must be contained in the message input to the web service operation; and program code for defining an output message pattern that describes an output message of the web service operation, wherein the output message pattern includes a set of variables and exemplars that represent data elements contained in the output message, and a graph pattern that semantically describes the data elements contained in the output message.

The foregoing features are of representative embodiments and are presented to assist in understanding the invention. It should be understood that they are not intended to be considered limitations on the invention as defined by the claims, or limitations on equivalents to the claims. Therefore, this summary of features should not be considered dispositive in determining equivalents. Additional features of the invention will become apparent in the following description, from the drawings and from the claims.

DETAILED DESCRIPTION OF EXEMPLARY EMBODIMENTS

Figure 1:
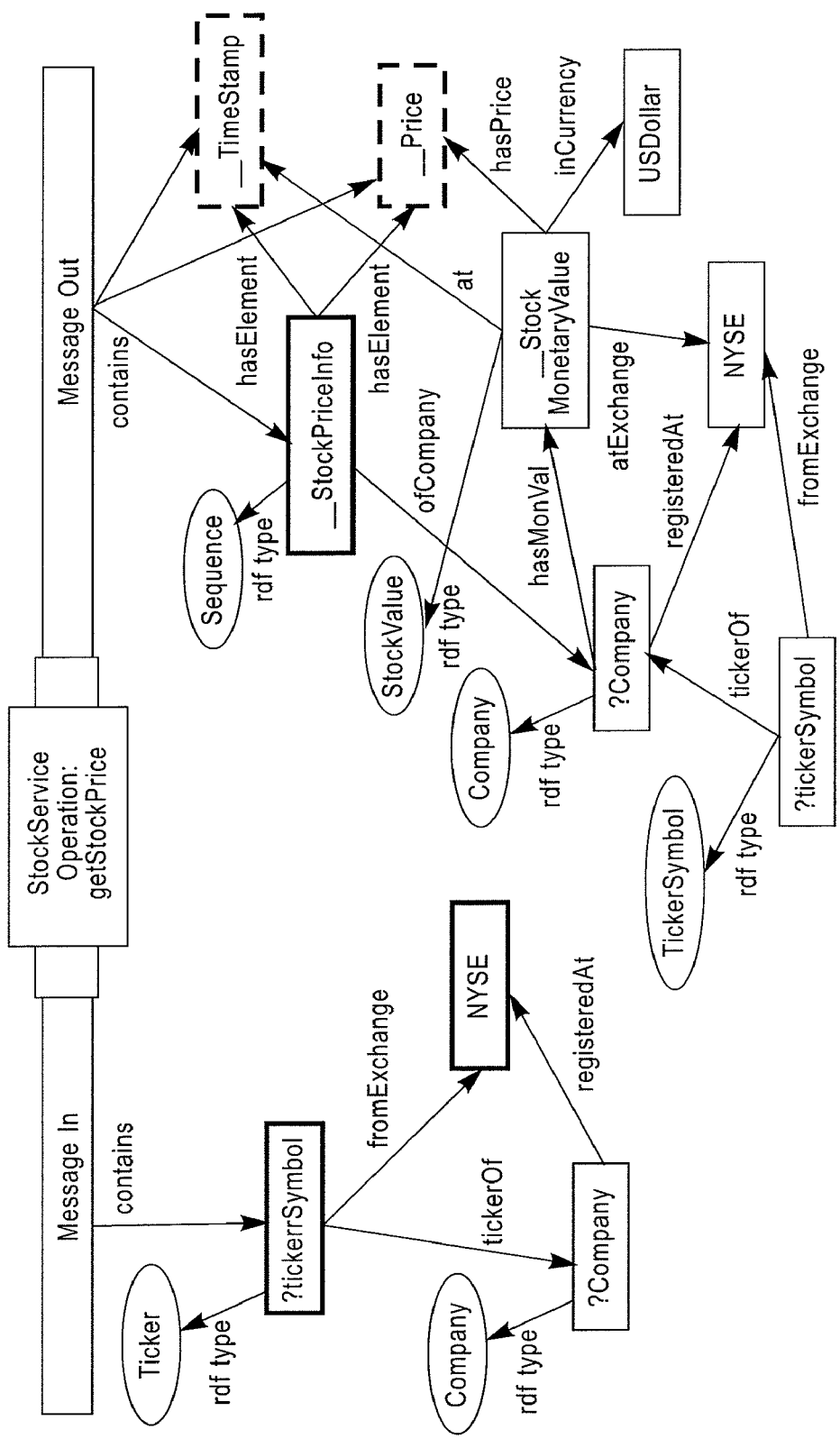
FIG. 1 illustrates a semantic description of a web service operation according to an exemplary embodiment of the present invention.

In accordance with an exemplary embodiment of the present invention, a model of associating rich semantic information with messages consumed and produced by web services is provided. The model describes input message requirements and an output message specification of each web service operation using resource description framework (RDF) graph patterns. The terms used in these patterns are defined in web ontology language (OWL) ontologies that describe the application domain.

By developing this model, automatic composition of workflows that process, transform or analyze data to produce some desired information is enabled. The model provides rich descriptions of the inputs and outputs of web service operations. This allows us to compare the semantics of the data produced as output by one or more operations and the semantics of the data required as input by another operation and decide if the two are compatible. The semantics-based comparability is better than a plain syntactic check and can help verify the semantic composability of two services.

The model provides both a workflow-independent and a workflow-dependent description of a web service operation. The workflow-independent description provides the minimal conditions that must be satisfied by the data provided as input to the operation, and the minimal conditions that will be satisfied by the data produced as output. In a given workflow, however, the actual data provided as input may have additional semantic constraints depending on the semantics of the data produced by previous services in the workflow. The actual data produced as output may similarly have additional constraints. Hence, the workflow-dependent description is a specialization of the workflow-independent description taking into account the actual semantics of the data given as input to the operation.

A key aspect of the model is the notion of semantic propagation, i.e., the semantic description of the output message of an operation depends on the semantics of the input message, which in turn depends on the semantics of the previous message in the workflow, and so forth. In order to model semantic propagations, we model operations using graph transformations (as described in L. Baresi and R. Heckel. Tutorial introduction to graph transformation: A software engineering perspective. In 1st Int. Conference on Graph Transformation, 2002, a copy of which is incorporated by reference herein in its entirety). The graph transformations allow replacing variables in the RDF graph pattern describing the output message with either single values or entire sub-graphs based on the actual semantics of the input message.

One difference between our model and other semantic web service models like OWL-S and SA-WSDL that describe or associate input and outputs using concepts in an ontology, is that our model describes input and output messages in terms of RDF graph patterns based on data instances that appear in these messages. Our approach allows associating constraints on these instances based on both the concepts (or classes) they belong to and their relationships to other instances. Such constraints are more difficult to express in pure concept-based representations and often require the creation of a large number of additional concepts corresponding to different combinations of constraints. In addition, the instance-based approach also allows describing messages of complex types such as sequences, and associating rich semantics with the elements within the complex type. As a result, our model allows associating rich semantic information about services, which aids the automatic composition of workflows that involve data processing and data transformation.

Another difference between our model and existing models like OWL-S and SA-WSDL is in the use of variables. For example, existing models do not allow expressions with variables for describing inputs and outputs. Our model describes inputs and outputs using graph patterns, which can be considered as logical expressions with variables. The use of variables allows our model to relate the semantics of outputs to the semantics of inputs. WSML (as described in de Bruijn. The Web Service Modeling Language WSML. http://www.wsmo.org/wsml/, 2005) also allows specifying axioms with variables in the pre- and port-conditions of a service capability. However, it does not have an explicit model of messages, which is necessary to determine if certain messages can be given as input to an operation. Our model explicitly defines the elements in a message and describes the semantics of these elements using an RDF graph consisting of OWL ABox assertions. This feature is useful during composition by artificial intelligence (AI) planning, when the planner needs to decide what kind of messages can be given as input to an operation and how it can construct these messages from other messages that have been produced so far by other operations in a partial plan.

Based on our model, we define the conditions under which web services can be connected to one another in a workflow. In accordance with another exemplary embodiment of the present invention, we have also developed a planner that can automatically build workflows given a user requirement in terms of a high-level web service whose inputs and outputs are also expressed as RDF graph patterns. The resulting workflow is represented in Business Process Execution Language (BPEL) and describes a directed acyclic graph (DAG) of services that can be invoked to perform the tasks required. The planner incorporates reasoning based on Description Logic Programs (DLP) (as described in B. Grosof, I. Horrocks, R. Volz, and S. Decker. Description logic programs: combining logic programs with description logic. In WWW '03, a copy of which is incorporated by reference herein in its entirety) in building plans. One of the features of the planner is the use of a two-phase approach, where pre-reasoning is performed on component descriptions and the results of the reasoning are then reused when generating plans for different user goals.

A description of exemplary embodiments of the present invention will now be provided in further detail under the following headings: Model of Web Services, Composing Services into Workflows; The Semantic Planner, and Evaluation.

Model of Web Services

In our model, web service operations are described by the kinds of messages they require as input and the kinds of messages they produce as output. The model describes the data elements contained in the input and output messages. In addition, it describes the semantics of these data elements using RDF graph patterns. Our model provides a blackbox description of the component; it only describes the inputs and outputs, and does not model the internal state of the component.

The Web Services Description Language (WSDL) description of a web service describes the inputs and outputs of an operation using types defined in Extensible Markup Language (XML) Schema. Our semantic model builds upon these types and attaches additional semantics to the input and output messages. In the following, we restrict our discussion to simple atomic xml schema types or complex types that are sequences. However, the model can be extended to accommodate other type definitions as well.

Consider, for example, a getStockPrice operation. It takes in a ticker symbol of a company and returns a price with a timestamp. Relevant snippets of the WSDL 2.0 description of the web service are shown below:

```
<types> <xs:schema>
    <xs:element name="tickerSymbol" type="xs:String"/>
    <xs:complexType name="stockPriceInfo">
        <xs:sequence>
            <xs:element name="price" type="xs:float"/>
            <xs:element name="timeStamp" type="xs:dateTime"/>
        </xs:sequence>
    </xs:complexType>
</xs:schema> </types>
<interface name="StockInterface" >
    <operation name="getStockPrice" >
        <input messageLabel="In" element="tickerSymbol" />
        <output messageLabel="Out" element="stockPriceInfo"/>
    </operation> </interface>
```

FIG. 1 shows the semantic description of this operation, with rectangle boxes representing OWL individuals or variables, ovals representing OWL classes and dashed rectangles representing literals. The semantic description captures many of the semantic conditions that must be satisfied by the input and output messages, which are missing from the WSDL declaration. The input message is described as containing one element, ?tickerSymbol, of some ?company registered at the NYSE (New York Stock Exchange). The output message contains a sequence (_StockPriceInfo) with two elements (_Price and _TimeStamp). The semantics of these elements are described in terms of an instance called _StockMonetary Value of the same ?company from the input, with a price _Price in USDollar at _TimeStamp. The exact meaning of the notations "?" and "_" will be described later.

The power of this semantic description is that it explicitly describes all the semantic relationships between the different data elements in a message as well as between the input and output messages. It describes the inputs and outputs in terms of instance-based graph patterns. This is in contrast to class-based descriptions that are commonly used in various interface description languages. The instance-based descriptions allow associating rich semantics to the web service, by specifying complex inter-relationships between different instances (for example, the relations between ?tickerSymbol, ?company and NYSE). Such relationships are more difficult to capture using class-based descriptions without having to create a large number of new classes for different combinations of the relationship constraints.

The semantic descriptions are based on one or domain ontologies in OWL that define various concepts, properties and instances in a domain of interest. A domain ontology in this scenario may define concepts like Company and Ticker, properties like tickerOf and fromExchange, and instances like NYSE and IRS.

We now describe the semantic model formally. Some of the elements of this model are adapted from SPARQL (as described in E. Prud'hommeaux and A. Seaborne SPARQL Query Language for RDF. In W3C Working Draft, 2006, a copy of which is incorporated by reference herein in its entirety), a standard RDF query language.

Let U be the set of all URIs Let $RDF_L$ be the set of all RDF Literals. The set of RDF Terms, $RDF_T$, is $U \cup RDF_L$. RDF also defines blank nodes, which we do not include in our model. An RDF Triple is a member of the set $U \times U \times RDF_T$. An RDF Graph is a set of RDF triples.

A variable is a member of the set V where V is infinite and disjoint from $RDF_T$. A variable is represented with a preceding "?".

A triple pattern is a member of the set $(RDF_T \cup V) \times U \times (RDF_T \cup V)$. An example is (?tickerSymbol ofCompany ?company).

A graph pattern is a set of triple patterns.

An input message pattern describes the properties of messages required by an operation. It is of the form IMP(VS,GP):
  VS is a set of variables representing the data elements that must be contained in the message, $VS \in 2^V$. If an element is a sequence, it recursively includes all elements in the sequence.
  GP is a graph pattern that describes the semantics of the data elements in the message.

In an output message, an operation may create new objects that did not appear in the input message. In the output message pattern description, these new objects are represented explicitly as exemplars. Exemplars act as existentially quantified variables, and are meant to represent example individuals and literals in an example output message. In a specific output message, these exemplars are replaced by RDF Terms. An exemplar individual is represented in OWL as belonging to a special concept called Exemplar. An exemplar literal is of a user defined type called xs:exemplar, which is derived from xs:string. Exemplars are represented with a preceding "_".

Let E represent the set of all exemplars. An output message pattern is of the form OMP(OS,GP):
  OS is a set of variables and exemplars, that represent the data elements that are contained in the output message. $OS \in 2^{V \cup E}$. If an element is a sequence, it recursively includes all elements in the sequence.
  GP is a graph pattern that describes the semantics of the data elements in the output message.

The output message description has a combination of variables and exemplars. Variables represent those entities that were carried forward from the input message description; and exemplars represent those entities that were created by the component in the output message description.

A web service operation is described as taking an input graph pattern and transforming into an output graph pattern. It is of the form W(IMP,OMP):
  IMP is an input message pattern that describes the input requirements of the operation.
  OMP is an output message pattern, that describes the output of the operation.
  The set of variables in OMP is a subset of the set of variables in IMP. This helps ensure that no free variables exist in the output description, an essential requirement for the planning process.

The semantics described so far is a workflow-in dependent description of the operation. In a specific workflow, this operation may get certain kinds of messages from another web service and hence, the semantics of its operation will differ.

Composing Services Into Workflows

The semantic model of web service operations allows us to determine if it is possible to use the output messages of one or more operations and construct a message that can be sent as input to another operation. We first illustrate the composition check through an example, and then provide a formal model for the composition.

Let us consider another web service called IRS CorpInfoService. It supports an operation that takes in an Employer ID Number (EIN) of a Corporation (as granted by the Internal Revenue Service) and returns the profile of the company including its name, address and ticker symbol.

```
<types> <xs:schema>
    <xs:element name="EIN" type="xs:String"/>
    <xs:complexType name="corpProfile">
        <xs:sequence>
            <xs:element name="name" type="xs:string"/>
            <xs:element name="address" type="xs:string"/>
            <xs:element name="ticker" type="xs:string"/>
        </xs:sequence>
    </xs:complexType>
</xs:schema> </types>
<interface name = "CorpProfileInterface" >
    <operation name="getCorpProfile" >
        <input messageLabel="In" element="EIN" />
        <output messageLabel="Out" element="corpProfile/>
    </operation> </interface>
```

Figure 2:
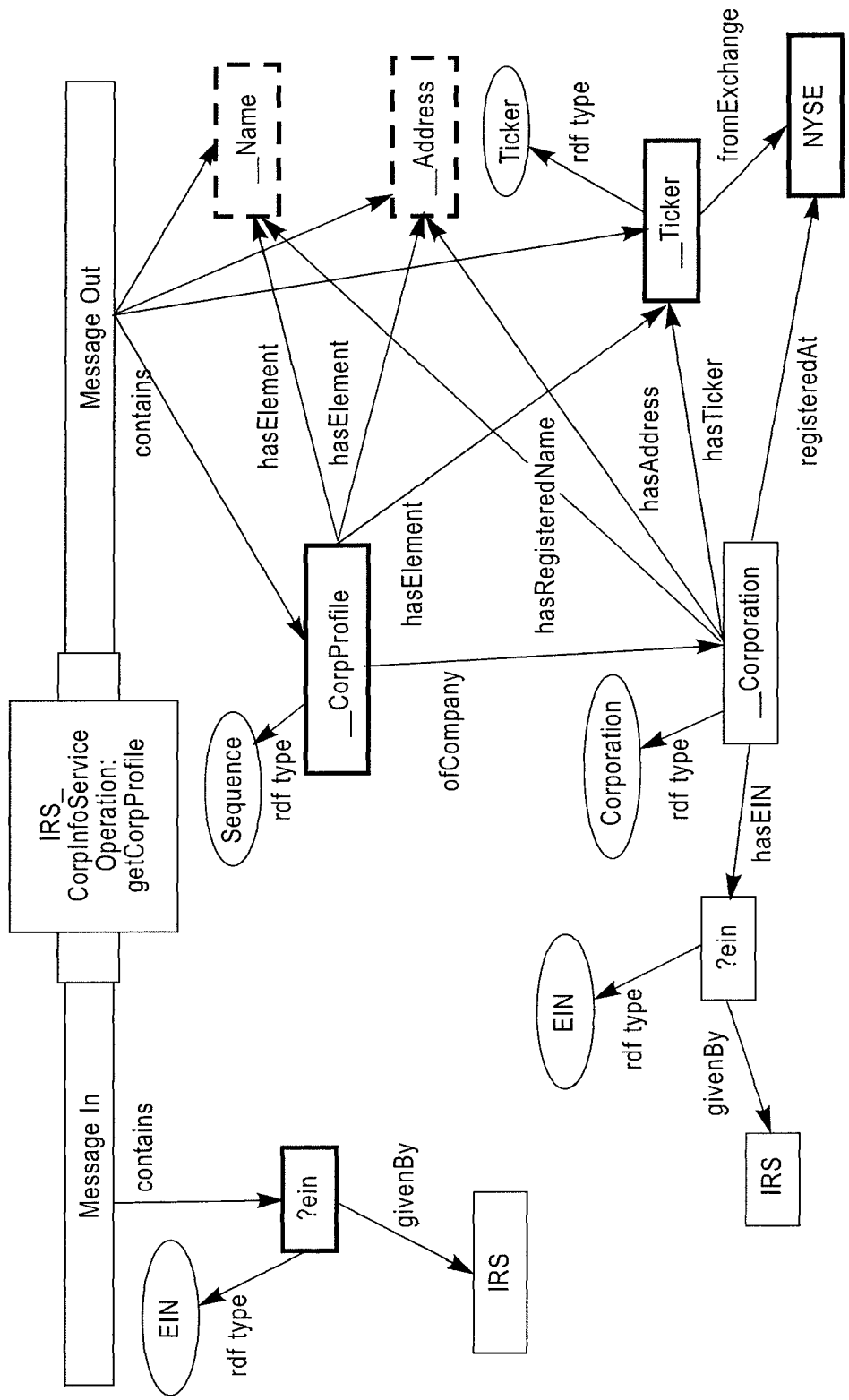
FIG. 2 illustrates a semantic description of another web service operation according to an exemplary embodiment of the present invention.

The semantic description of this service is shown in FIG. 2, with rectangle boxes representing OWL individuals or variables, ovals representing OWL classes and dashed rectangles representing literals. Now, the question we shall try to answer is whether this service can be composed with the StockService in a BPEL workflow that receives an EIN given by IRS and replies with the stock price of the corporation that has this EIN. Intuitively, the getCorpProfile operation can be used to get the ticker symbol of the corporation, and then the getStockPrice operation of the StockService can be used to get the stock price. However, an automated workflow composer will not be able to perform this composition just by looking at the WSDL description. The types of the messages in the input and output messages are different for the two operations. In addition, the WSDL description does not describe exactly how the elements of the inputs relate to the outputs.

Our semantic descriptions of the services, however, provide enough information to compose these two services. In addition, the semantic descriptions can be used to generate a copy statement in the BPEL script to copy the ticker element from the output message of the getCorpProfile operation to the input message of the getStockPrice operation. We shall now describe the necessary conditions for matching the output of one service to the input of another.

Figure 3A:
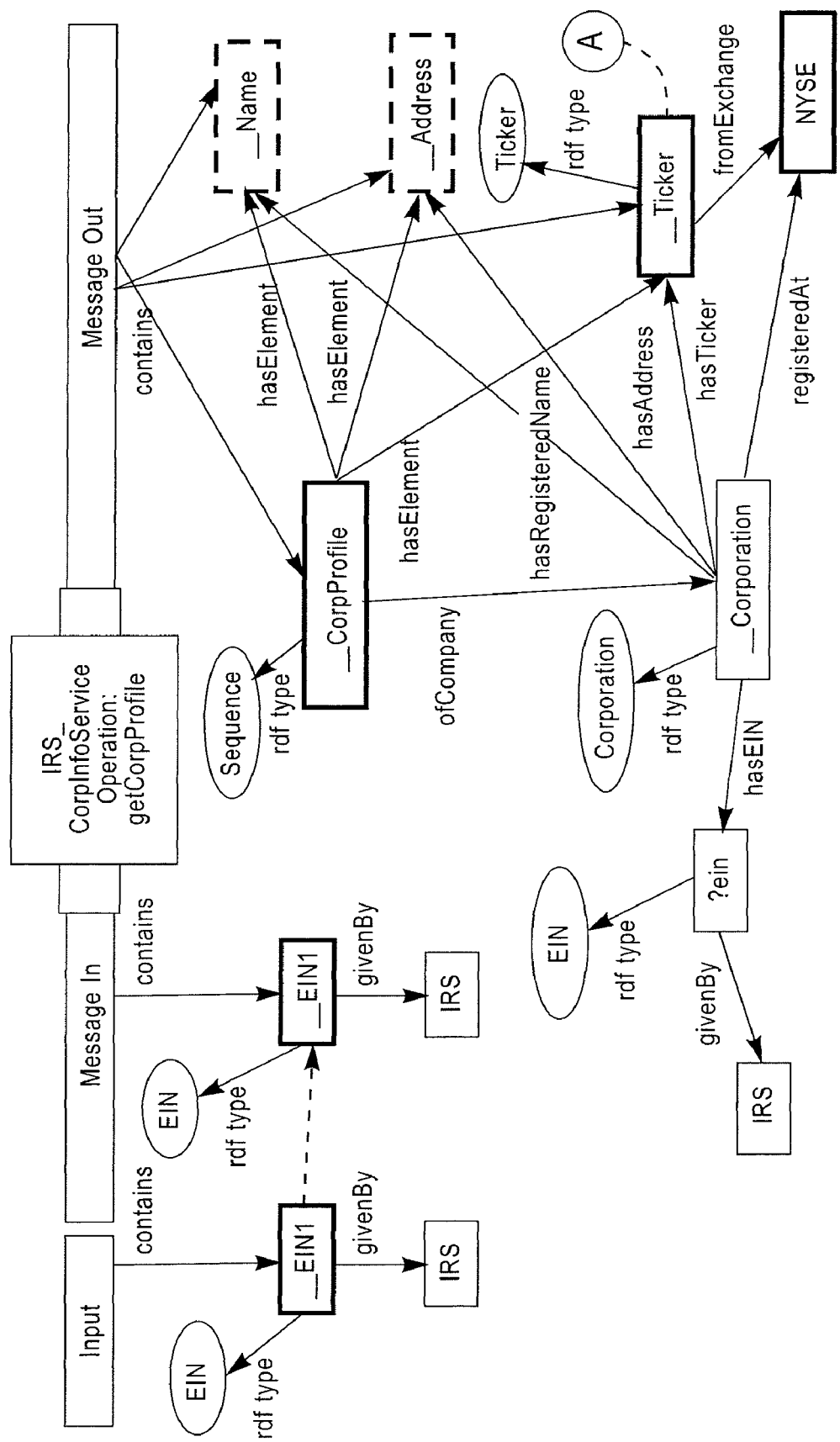
FIGS. 3A and 3B illustrate how the semantic descriptions of the web service operations shown in FIGS. 1 and 2 change as a result of composing the web service operations into a workflow according to an exemplary embodiment of the present invention.
Figure 3B:
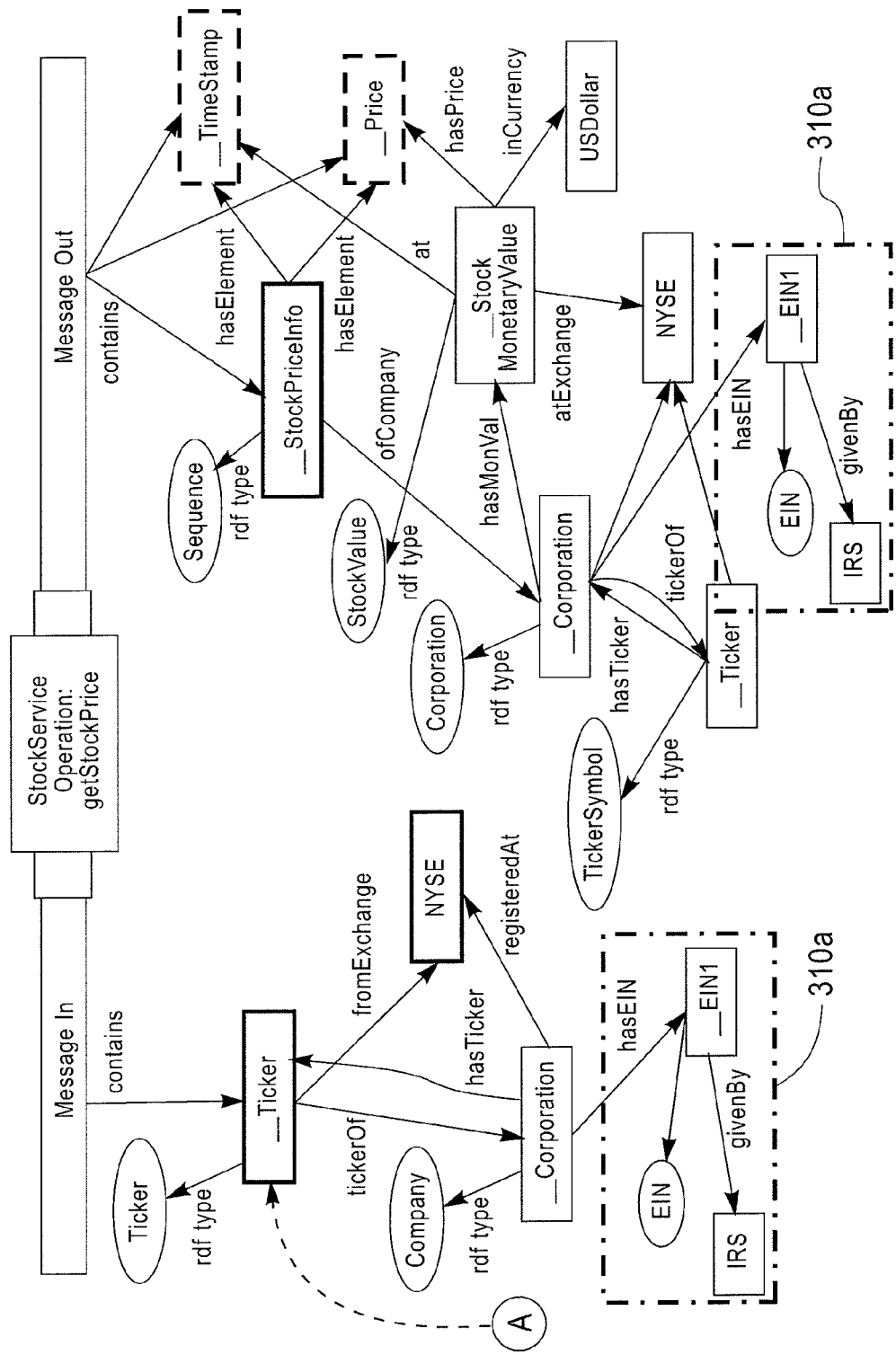

FIGS. 3A and 3B show the composed view of the services and how their semantic descriptions change as a result of the composition. In FIGS. 3A and 3B, dashed arrows represent copy statements that extract data elements from one message to initialize the input message to another operation. In FIG. 3B, the shaded rectangles 310a show a portion of the workflow-dependent description of the StockService that does not appear in the workflow-independent description in FIG. 1 and that has been derived from the previous service. In FIGS. 3A and 3B, the input to getCorpProfile is described using an exemplar that is created by the web service partner that calls the composed service. This exemplar, called _EIN1, is described as having been issued by the IRS. The message matches the input message pattern requirement of get-Corp-Profile. As a result, the variable ?ein in the input message pattern is substituted by _EIN1, and this substitution is propagated to the output message pattern as well.

The next step is to see whether the output of getCorpProfile (or any part of it) can be sent as input to the getStockPrice operation. This involves matching the output message with the input message pattern of getStockPrice. This matching process, determines that the ticker element of the output message can be extracted and sent as input to getStockPrice. The matching process uses description logic reasoning based on ontologies that state, for example, that Corporation is a subclass of Company. As a result of the matching, the input and output message patterns of getStockPrice have their variables replaced by RDF graphs in the workflow-dependent description. This description includes additional semantic constraints (like the fact that the corporation has a certain EIN given by IRS) which are derived from the match on the input and are propagated to the output.

Workflow Model

A workflow is a graph $G(V,E)$ where G is a DAG. Each vertex $v_i \in V$ is a web service operation. Each edge $(u, v)$ represents a logical flow of messages from u to v. If there is an edge $(u, v)$, then it means that an output message produced by u is used to create an input message to v. If v has many incoming edges of the form $(u_1, v), \ldots (u_n, v)$, it means that the output messages of $u_1, \ldots u_n$ are all used to create an input message to v. This is done by copying data elements from the output messages of $u_1, u_2, \ldots u_n$ into the input message sent to v.

This model can be represented as a BPEL workflow. A BPEL workflow can be viewed as one request-response operation, i.e., there is one partner web service that makes a request to the workflow and receives a reply from it. We model this partner web service using two vertices in the DAG. One vertex called the source makes the request to the workflow. The source vertex has no incoming edges. Another vertex called the sink receives the reply from the workflow. The sink has no outgoing edges.

The BPEL workflow has one receive and one reply activity. Each vertex corresponds to an invoke activity. In addition, just before the invoke activity is performed, there may be one or more assign activities that take in messages from the incoming edges to the node and create an input message that will be used as input in the invocation of the web service. Depending on the structure of the graph, a number of flow and sequence activities are used to describe how the invocations to services proceed. The reason we restrict the workflow model to a DAG is that it is extremely difficult to create plans with cycles. Most AI planners create partially ordered plans, which can be represented as DAGs.

For every vertex u, we define the semantics of a typical or exemplar message that is produced as output by u and that is sent on all outgoing edges from u. This exemplar message description is based on exemplar individuals and literals that appear in this message. An exemplar message is of the form $M(E,R)$ where E is the set of elements in the message, represented as exemplars R is an RDF graph that describes the semantics of the data elements in the message. The RDF graph consists of a set of OWL facts (ABox assertions).

Matching a Set of Messages to an Input Message Pattern

Consider vertex v in the workflow DAG. Let v have n incoming edges: $(u_1, v), \ldots (u_n, v)$, i.e., the output messages of $u_1, \ldots u_n$ are all used to create an input message to v. Let the semantics of the messages on the edge $(u_i, v)$ be described by the exemplar message $M_i(E_i, R_i)$. Let the input requirements of v be described by the input message pattern $P(VS,GP)$. Let O be a common domain ontology that defines the TBox, on which the descriptions of the messages and message pattern are based. O may also define some ABox assertions on non-exemplar individuals.

We say that v is validly deployed iff there is a match between the exemplar messages, $\{(M_1, \ldots M_n)\}$, and the input message pattern P. Such a match is possible iff there exists a substitution of variables, $\theta$, defined from the set of variables to the set of OWL individuals or literals, such that:

$\cup_{i=1}^{n} E_i \supseteq \theta(VS)$. That is, the messages contain at least all the elements required in the message pattern $\cup_{i=1}^{n} R_i \cup O \models \theta(GP)$ where $\models$ is an entailment relation defined between RDF graphs. That is, it should be possible to infer the graph pattern, after substituting the variables in it, from the RDF graphs describing the different input messages. The actual entailment relation may be based on RDF, OWL-Lite, OWL-DL, OWL-DLP or other logics.

We represent this match as $\{M_1, \ldots M_n\} \rightarrow_\theta P$, i.e., exemplar messages $M_1, \ldots M_n$ match the message pattern, MP, with a substitution function $\theta$. If such a match exists, then, it is possible to copy some of the elements corresponding to $\theta(VS)$ and create an input message to v.

As an example, getCorpProfile produces an output message (represented as CP), which matches getStockPrice's input message pattern (represented as GSP). Using a substitution, $\theta_1$, defined as $\theta_1(?tickerSymbol)=ticker$ and $\theta_1(?company)=XYZ$, we can see that $CP \rightarrow_{\theta_1} GSP$. The entailment derivation process is based on a suitable flavor of OWL (like OWL-DL or OWL-DLP) and uses TBox definitions in the ontology like Corporation is a subclass of Company, and tickerOf is the inverse of has Ticker.

Semantic Propagation

One of the features of our model is semantic propagation, i.e., the actual semantic description of the output messages of an operation in a workflow depends on the semantics of the input messages. This propagation is achieved through the use of common variables in the input and output message patterns. The workflow-dependent description of a web service is a specialization of the workflow-independent description where the variables are replaced by RDF graphs that are obtained from the actual input message given to the service. This is a more expressive model than one where variables are only substituted by single values, and allows the propagation of graphs representing semantic constraints from one service to the next in a workflow. FIGS. 3A and 3B illustrate an example where variables like ?ticker, ?company and ?ein that appear in the workflow-independent descriptions in FIGS. 1 and 2 are replaced by graphs that include the nodes _Ticker, _Corporation and _EIN1. In addition, the workflow-dependent description of the StockService has additional constraints (represented by the subgraph containing EIN1 and IRS) that do not appear in the workflow-independent description.

Formally, the description of the output message is generated using a graph transformation operation (as described in L. Baresi and R. Heckel. Tutorial introduction to graph transformation: A software engineering perspective. In $1^{st}$ Int. Conference on Graph Transformation, 2002), that combines the description of the input message with the output message pattern. Graph transformations have been used in software engineering to describe the behavior of components in terms of transformations of graphs like Unified Modeling Language (UML) object diagrams. We apply these ideas to describe the behavior of components based on transformation of RDF graph patterns.

Let L be the input graph-pattern and R the output graph pattern of the operation. Now, assume that in an actual workflow, L has been matched to a message with an RDF graph, X, with the variable substitution function, θ. Let the output message for this workflow contain the RDF graph, Y. We determine Y using a graph homomorphism, f.

$$f: \theta(L) \cup \theta(R) \rightarrow X \cup Y$$

In our model, f satisfies the following properties:
1. $f(\theta(L)) \subseteq X$. This means that the substituted input graph-pattern is a subgraph of the graph describing the message matched to it. This follows from the entailment relation obtained between the input message pattern and the message.
2. $f(\theta(R_i)) \subseteq Y_i$. This means that the substituted output graph-pattern is a subgraph of the output message.
3. $f(\theta(L)\backslash\theta(R))=X\backslash Y$ and $f(\theta(R)\backslash\theta(L))=Y\backslash X$ where \represents the graph difference operation. This means that exactly that part of X is deleted which is matched by elements of θ(L) not in θ(R), and exactly that part of Y is created that is matched by elements new in θ(R).

Using properties 2 and 3, it is possible to determine the output Y, of an operation as a result of giving X as input in a certain workflow. This operation is performed in two main steps. In the first step, we remove all the edges and vertices from X that are not present in L, but not present in R. In the second step, we glue in vertices and edges that are newly created in R.

The Semantic Planner

Figure 4:
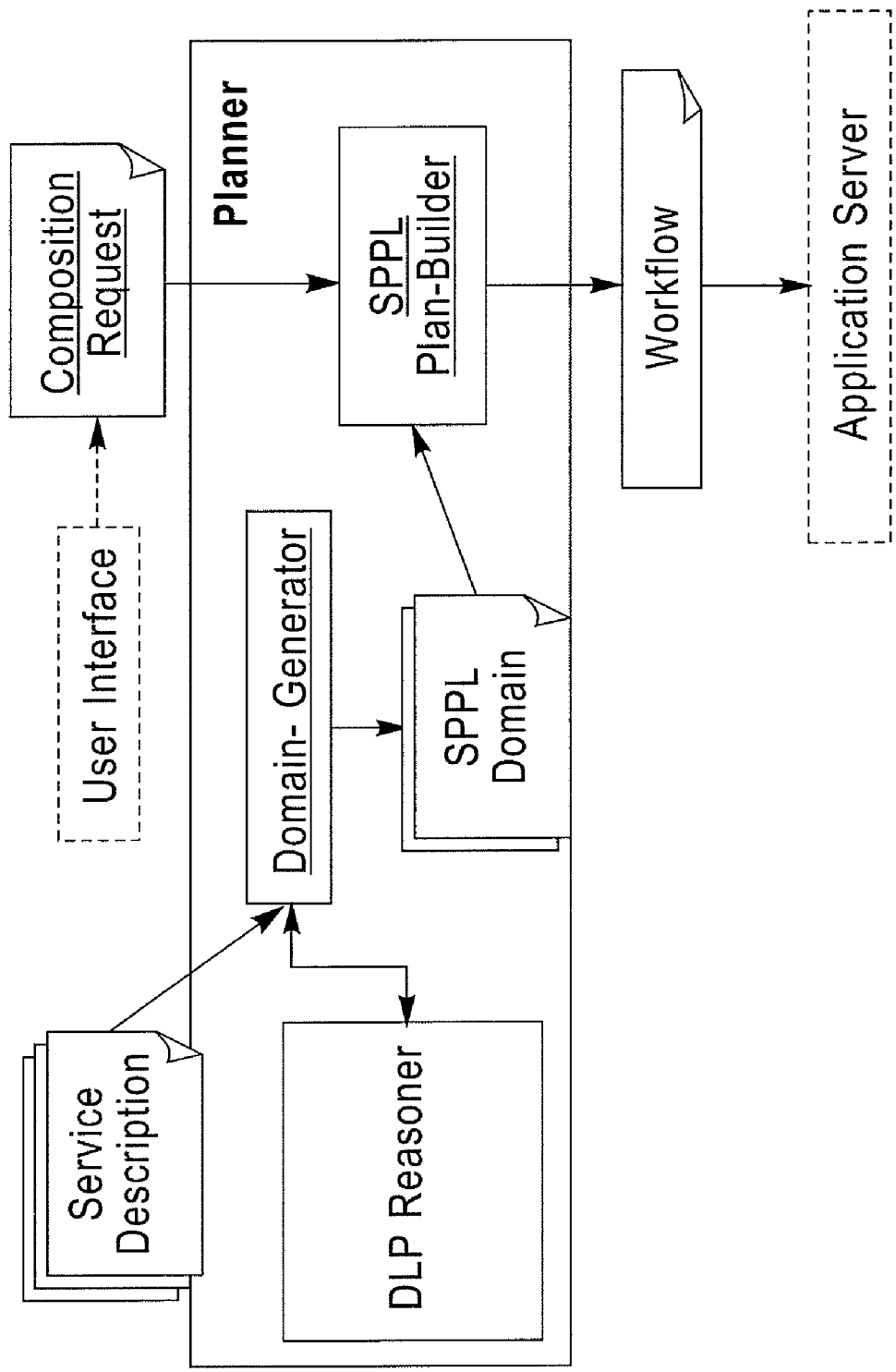
FIG. 4 illustrates a semantic planner according to an exemplary embodiment of the present invention.

We have developed a semantic planner (shown in FIG. 4) that can compose a BPEL workflow automatically from the semantic descriptions of services with the aid of description logic reasoning. A workflow to be composed is described as a high-level web service that takes in a request and produces a response. The request is described as an exemplar message, Req(E,R), and the response message is described as an input message pattern, Res(VS,GP). For example, the request message may be described as containing one element, which is an EIN given by IRS and the response message must contain one element: the stock price of a corporation that has this EIN. The output of the composition problem is a workflow G(V,E), such that:

The workflow has a source vertex, $v_{src}$, and all outgoing edges from $v_{src}$ are associated with the semantics defined in the request message, Req(E,R).

The workflow has a sink vertex, $v_{snk}$, such that there is a match between the exemplar messages associated with the incoming edges and the response message pattern, Res(VS,GP)

All the other vertices in the workflow represent web service operations that are validly deployed.

The composition problem can be modeled as a planning problem. Each web service operation. $W(P_i, P_o)$, is an action. The preconditions of the action include the constraints on an input message, as specified in $P_i$. The effects of the action involve creating a new message, the properties of which are described in $P_o$. The initial state in the planning problem contains only the request message, Req(E,R). The goal of the planning problem is to create a message that satisfies the response message pattern, Res(VS,GP).

Our planner models the current state as the set of messages created so far. At a high level, the planner works by checking if a set of messages available in the current state can be used to construct an input to an operation, and if so, it generates a new message corresponding to the output. It performs this process recursively and keeps generating new messages until it produces one that matches the goal pattern, or until no new unique messages can be produced.

Description logic reasoning during planning is useful since it allows the planner to match messages to input message patterns even if they are described using different terms and different graph structures. However, this introduces some challenges. One challenge is scalability: invoking a reasoner during planning is expensive. Another challenge is that any reasoner used in this process must keep all facts in the description of one message independent of the facts in the description of other messages; and facts across different messages cannot be combined to infer any additional facts. During the planning process, a very large number of messages may be generated by connecting services into partial workflows. Available reasoners cannot maintain the facts of such a large number of different messages independently and answer queries on individual messages.

To overcome these challenges, the planner employs a two-phase approach to plan building. In the first phase, which occurs offline, it does pre-reasoning on the output descriptions of different operations. During this phase, it does DLP-reasoning (as described in B. Grosof, I. Horrocks, R. Volz, and S. Decker. Description logic programs: combining logic programs with description logic. In WWW '03) on the descriptions of components and translates them into a language called SPPL (Stream Processing Planning Language) (as described in A. Riabov and Z. Liu. Planning for stream processing systems. In AAAI, 2005, a copy of which is incorporated by reference herein in its entirety). SPPL is a variant of PDDL (Planning Domain Definition Language) and is specialized for describing stream-based planning tasks (a stream can be considered to be a generalization of a message). It models the state of the world as a set of streams and different predicates are interpreted only in the context of a stream. The SPPL descriptions of different components are persisted and re-used for multiple goals. The second phase is triggered whenever an goal is submitted to the system. During this phase, the planner performs branch-and-bound forward search by connecting all compatible operations in a DAG. It uses some optimizations by analyzing the problem structure and removing operations that cannot contribute to the goal to help restrict the search space. Further details of this plan-search phase can be found in A. Riabov and Z. Liu. Planning for stream processing systems. In AAAI, 2005.

A key feature of our planning process is that DLP reasoning is performed only once for a component, in an offline manner. During actual plan generation, the planner does not do any reasoning. It only does subgraph matching; it tries to find a substitution of variables so that the input message graph pattern of a component can be matched to the new object graph of a stream. This allows the matching process to be faster than if reasoning was performed during matching. In addition, it eliminates the need for a reasoner that has to maintain and reason about independent stream descriptions during the plan-building process. The reasoner is only invoked when a new component is added to the system. The reason for the choice of DLP (which lies in the intersection of Datalog and DL) for reasoning is that it allows us to enumerate all inferred facts from a given set of facts and is hence suitable for this two-phase planning approach.

Pre-Reasoning and SPPL Generation

The Domain-Generator performs DLP-reasoning on the output message graph patterns of different services. Inference on the ABox in DLP can be performed using a set of logic rules. This allows us to take a certain assertion and enumerate all possible assertions that can be inferred from this assertion and an ontology using the rules. The ability to enumerate all inferences is a key reason for the choice of DLP for reasoning. Since we cannot directly perform inferences on variables, we convert them into OWL individuals that belong to a special concept called Variable. Using this process, a graph pattern can be converted into an OWL/RDF graph for the purposes of reasoning, and additional facts about variables and exemplars can be inferred.

Pre-reasoning gives us an expanded message description, which contains an RDF graph that has been expanded with the results of reasoning. Reasoning is done by applying the DLP logic rules recursively, in a bottom-up fashion, on the triples in the original graph G based on definitions in the imported ontology, O, and generating additional triples about variables and exemplars, until a fix point is reached. The reasoner used by our system is Minerva (as described in Zhou, J.; Ma, L.; Liu, Q.; Zhang, L.; Yu, Y.; and Pan, Y. 2004. Minerva: A scalable OWL ontology storage and inference system. In $1^{st}$ Asian Semantic Web Symp., a copy of which is incorporated by reference herein in its entirety). For example, consider the output message of the getStockPrice operation. The expanded message description includes additional facts like (?company hasTicker ?tickerSymbol) (since hasTicker is defined to be an inverse of tickerOf in the ontology).

After pre-reasoning, the expanded descriptions of services are represented as an SPPL domain, and stored for later use. Concepts used in the descriptions are mapped to SPPL types. Subclass relationships between concepts are also captured in SPPL, which supports multiple inheritance. The set of SPPL predicates includes all properties in the descriptions. The set of SPPL objects includes all literals, RDF Terms and new objects in the descriptions.

Each operation is translated info an SPPL action. The input message pattern is translated into a precondition, and each output message pattern is translated into an effect. In order to obtain the list of predicates for the preconditions and effects, the generator traverses the graph patterns and obtains all constraints on the exemplars and variables.

Plan-Building

A composition requirement received by the planner is translated into an SPPL problem. The SPPL model yields a recursive formulation of the planning problem, where goals are expressed similarly to service input requirements, and they are matched to streams produced as outputs by services. The Plan-Builder operates in two phases: a presolve phase and a plan search phase (as described in Riabov, A., and Liu, Z., 2006. Scalable planning for distributed stream processing systems. In *ICAPS* '06, a copy of which is incorporated by reference herein in its entirety). The planner is capable of finding optimal plans for user-defined additive plan quality metrics. In our experiments, the optimization objective was to minimize the number of services included in the plan.

During the presolve phase, the planner analyzes the problem structure and removes sources that cannot contribute to the goals, to help restrict the search space. It also translates predicate formulation into a propositional one before searching for the plan. The translation is done by creating all reachable bindings for action parameters, and creating prepositional actions with these bindings such that only ground predicates appear in inputs and outputs. This step can have significant memory requirements when used with ontologies that have large numbers of individuals. However, simple techniques can significantly reduce the number of possible variable bindings. In particular, only those individuals that are used in describing services or in message patterns need to be represented in SPPL as objects.

In plan search phase, the planner performs branch-and-bound backward search. The branch-and-bound nodes are expanded backwards, starting from the open goals, leading to the creation of new sub-goals. The sub-goals may be satisfied by existing messages or by outputs of new action instances. A sub-goal is satisfied when all predicates of the sub-goal appear in the connected message. All possible choices for satisfying the goals are explored, unless exploring the goals violates quality bounds. To reduce the time required for finding action candidates for satisfying a sub-goal, during presolve the planner generates an index of compatible action preconditions and effects. All pairs of effects and preconditions that cannot be proven incompatible before planning are added as possibly compatible to the index, and a more detailed investigation of compatibility is performed during planning.

Our two phase matching process, consisting of prereasoning and sub-graph matching, is sound. If our process does find that a stream matches an input message pattern, then this match is correct since the stream description only contains facts that were present in the original description or that were inferred after DLP reasoning, which is sound. However, our matching process is not complete. The planner builds the description of new messages by instantiating the output message pattern based on the variable substitution for the matching of the input pattern. Since reasoning is only performed offline on output message patterns, it is possible that the description of the new message may not contain all facts that can be inferred by DLP reasoning. In our design, we sacrifice completeness for performance. Since we avoid using the reasoner during plan-building, the matching of streams to services becomes much simpler and the planner can scale to handle large numbers of services.

Evaluation

Scalability of our approach depends on the ability of the planner to handle a large number of sources. To evaluate compiler performance, we measured inquiry planning time on increasingly large randomly generated sets of sources. Experiments were carried out on a 3 GHz Intel Pentium 4 PC with 500 MB memory. A locally deployed IBM DB2 database server was used as a repository for ontologies.

For our experiments, we generated random DAG plans, with one service for each node in the DAG. The DAGs were generated by distributing the nodes randomly inside a unit square, and creating an arc from each node to any other node that has strictly higher coordinates in both dimensions with probability 0.4. The resulting connected components are then connected to a single output node. Each link is associated with a randomly generated stream pattern that includes an RDF graph pattern built from a financial services ontology in OWL that had about 200 concepts, 80 properties and 6000 individuals. The time (in seconds) taken to plan the DAGs given a goal that represents the output messages received by the final node are shown below in Table 1. Table 1 has columns for the number of services and messages in the generated graph, as well as time measurements for the online and offline phases of planning.

TABLE 1

| Experiment 1 | | | | Experiment 2 | | |
|---|---|---|---|---|---|---|
| Srves | Msgs | Prereason | Plan | Srves | Prereason | Plan |
| 10 | 15 | 4.66 | 0.15 | 27 | 13.99 | 0.24 |
| 20 | 40 | 10.29 | 0.22 | 42 | 25.01 | 0.69 |
| 30 | 119 | 27.49 | 0.76 | 72 | 47.21 | 1.74 |
| 40 | 190 | 38.48 | 1.21 | 102 | 67.48 | 3.06 |
| 50 | 288 | 59.17 | 2.26 | 162 | 107.88 | 7.75 |
| 100 | 1.204 | 233.03 | 28.73 | 312 | 224.85 | 29.20 |

In Experiment 1 all generated web services were used in the same plan. In practice, however, the processing graphs are likely to be of relatively small sizes, but there could be many services that are not used in the produced processing graph. To model this scenario, we generated a large number of services, with only 2 candidate plans graphs of 6 nodes each. The results are presented in Table 1, Experiment 2.

The experiments show that our pre-reasoning approach makes semantic planning practical by improving planner scalability. Although pre-reasoning is time consuming, the results of pre-reasoning can be shared between multiple planning requests. Therefore, the observed response time of the planning system in practice is close to planning phase time. We can see that even for plan graphs involving 100 components, the planner is able to produce the plan in less than 30 seconds, which is an acceptable performance.

It should also be understood that the present, invention may be implemented in various forms of hardware, software, firmware, special purpose processors, or a combination thereof. In one embodiment, the present invention may be implemented in software as an application program tangibly embodied on a program storage device (e.g., magnetic floppy disk, RAM, CD ROM, DVD, ROM, and flash memory). The application program may be uploaded to, and executed by, a machine comprising any suitable architecture.

It is to be further understood that because some of the constituent system components and method steps depicted in the accompanying figures may be implemented in software, the actual connections between the system components (or the process steps) may differ depending on the manner in which the present invention is programmed. Given the teachings of the present invention provided herein, one of ordinary skill in the art will be able to contemplate these and similar implementations or configurations of the present invention.

It should also be understood that the above description is only representative of illustrative embodiments. For the convenience of the reader, the above description has focused on a representative sample of possible embodiments, a sample that is illustrative of the principles of the invention. The description has not attempted to exhaustively enumerate all possible variations. That alternative embodiments may not have been presented for a specific portion of the invention, or that further undescribed alternatives may be available for a portion, is not to be considered a disclaimer of those alternate embodiments. Other applications and embodiments can be implemented without departing from the spirit and scope of the present invention.

It is therefore intended, that the invention not be limited to the specifically described embodiments, because numerous permutations and combinations of the above and implementations involving non-inventive substitutions for the above can be created, but the invention is to be defined in accordance with the claims that follow. It can be appreciated that many of those undescribed embodiments are within the literal scope of the following claims, and that others are equivalent.

What is claimed is:

1. A method for modeling a web service operation, comprising:
   defining an input message pattern that describes input requirements of a web service operation, wherein the input message pattern includes a set of variables representing data elements that must be contained in a message input to the web service operation, and a graph pattern that semantically describes the data elements that must be contained in the message input to the web service operation; and
   defining an output message pattern that describes an output message of the web service operation, wherein the output message pattern includes a set of variables and exemplars that represent data elements contained in the output message, and a graph pattern that semantically describes the data elements contained in the output message,
   wherein only the input and output message patterns are used to model the web service operation and the method is performed using a processor,
   wherein a first message input to the web service operation includes request for information and the input requirements of the web service operation are the criteria that must be established by the first message in order for the web service operation to be executed to generate the requested information and output the generated information in a first output message, and
   wherein every one of the variables in the output message pattern must be included in the input message pattern.

2. The method of claim 1, wherein each of the variables is a member of a first set, wherein the first set is infinite and disjoint from a set of resource description framework (RDF) terms.

3. The method of claim 2, wherein a triple pattern is a member of a second set, wherein the second set includes tuples with three fields, wherein first and third fields of the three fields are members of a third set, wherein the third set includes a union of the set of RDF terms and the first set, and a second field of the three fields is a universal resource indicator (URI).

4. The method of claim 3, wherein each of the graph patterns is a set of triple patterns.

5. The method of claim 1, wherein the variables of the output message pattern represent data elements carried forward from the message input to the web service operation.

6. The method of claim 1, wherein the exemplars represent new objects that did not appear in the message input to the web service operation.

7. The method of claim 6, wherein the exemplars are represented as individuals or literals in a web ontology language (OWL).

8. A method for composing a workflow made up of web service operations, comprising:
   inputting a plurality of modeled web service operations, wherein each of the web service operations includes:

a pre-defined input message pattern, wherein the input message pattern includes a set of variables representing data elements that must be contained in a message input to the web service operation, and a graph pattern that semantically describes the data elements that must be contained in the message input to the web service operation; and a pre-defined output message pattern, wherein the output message pattern includes a set of variables and exemplars that represent data elements contained in the output message, and a graph pattern that semantically describes the data elements contained in the output message;

inputting a request of a workflow to be composed, wherein the request includes an exemplar request message and a response message pattern; and composing a workflow in the form of a directed acyclic graph (DAG) that has a source vertex, wherein all outgoing edges from the source vertex are associated with semantics defined in the exemplar request message, and that has a sink vertex such that there is a match between exemplar messages associated with incoming edges to the sink vertex and the response message pattern, wherein only the input and output message patterns are used to model the web service operation and the method is performed using a processor, wherein constraints are associated to the data elements based on both a class that they belong to and their relationships to other data elements without requiring new class creations for different combinations of relationships, and wherein the association of the constraints to the data elements involves ontology-based reasoning.

9. The method of claim 8, wherein the exemplar request message includes a set of data elements, and a resource description framework (RDF) graph that semantically describes the data elements in the exemplar request message.

10. The method of claim 9, wherein the RDF graph of the exemplar request message includes triples that represent facts in a web ontology language (OWL).

11. The method of claim 8, wherein the response message pattern includes a set of variables that correspond to data elements that must be present in an output of the workflow, and an RDF graph pattern that semantically describes constraints on values of the variables of the response message pattern and relationships between different variables of the response message pattern.

12. The method of claim 8, wherein each vertex apart from the source and sink vertices is one of the modeled web service operations.

13. The method of claim 8, wherein for each vertex representing a web service operation in the workflow there is a match between exemplar messages associated with incoming edges to the vertex and the input message pattern of the web service operation.

14. The method of claim 13, wherein the match between exemplar messages associated with incoming edges to the vertex and the input message pattern of the web service operation exists when there is a substitution of variables defined in the input message pattern such that:

the exemplar messages include at least all the data elements that must be contained in the message input to the web service operation; and an RDF graph obtained after substituting variables in the input graph pattern is logically inferred from a union of RDF graphs in the exemplar messages.

15. The method of claim 14, wherein the logic inference is based on a description logic process.

16. The method of claim 8, wherein a match between exemplar messages associated with incoming edges to the sink vertex and the response message pattern of the workflow exists when there is a substitution of variables defined in the input message pattern such that:

the exemplar messages include at least all the data elements that must be contained in a response message defined in the response message pattern of the workflow; and an RDF graph obtained after substituting variables in the graph pattern that is part of the response message pattern is logically inferred from a union of RDF graphs in the exemplar messages.

17. A computer program product comprising a program storage device having computer program logic recorded thereon for modeling a web service operation, the computer program logic comprising:

program code for defining an input message pattern that describes input requirements of a web service operation, wherein the input message pattern includes a set of variables representing data elements that must be contained in a message input to the web service operation, and a graph pattern that semantically describes the data elements that must be contained in the message input to the web service operation; and program code for defining an output message pattern that describes an output message of the web service operation, wherein the output message pattern includes a set of variables and exemplars that represent data elements contained in the output message, and a graph pattern that semantically describes the data elements contained in the output message, wherein only the input and output message patterns are used to model the web service operation, wherein a first message input to the web service operation includes request for information and the input requirements of the web service operation are the criteria that must be established by the first message in order for the web service operation to be executed to generate the requested information and output the generated information in a first output message, and wherein every one of the variables in the output message pattern must be included in the input message pattern.

* * * * *